United States Patent
Mantha (10) Patent No.: US 7,421,279 B2
(45) Date of Patent: *Sep. 2, 2008

(54) METHOD, SYSTEM AND APPARATUS FOR IMPROVING RECEPTION IN MULTIPLE ACCESS COMMUNICATION SYSTEMS

(75) Inventor: Ramesh Mantha, Toronto (CA)

(73) Assignee: Soma Networks, Inc., San Francisco, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/157,851

(22) Filed: Jun. 22, 2005

(65) Prior Publication Data

US 2005/0233698 A1      Oct. 20, 2005

Related U.S. Application Data

(63) Continuation of application No. 09/722,568, filed on Nov. 28, 2000, now Pat. No. 6,952,589.

(30) Foreign Application Priority Data

Oct. 11, 2000    (CA) ..................................... 2323164

(51) Int. Cl.
    *H04B 15/00* (2006.01)
(52) U.S. Cl. ................... 455/501; 455/63.1; 455/67.13; 370/252; 370/350
(58) Field of Classification Search ................ 455/501, 455/63.1, 67.13; 370/252, 350
    See application file for complete search history.

(56) References Cited

U.S. PATENT DOCUMENTS

| | | | |
|---|---|---|---|
| 5,046,133 A | 9/1991 | Watanabe et al. | |
| 5,740,166 A | 4/1998 | Ekemark et al. | |
| 5,835,489 A | 11/1998 | Moriya et al. | |
| 6,034,986 A | 3/2000 | Yellin | |
| 6,223,040 B1 | 4/2001 | Dam | |
| 6,487,174 B1 * | 11/2002 | Mizuguchi et al. | 370/252 |
| 6,498,784 B1 | 12/2002 | Ozluturk | |
| 6,498,928 B1 | 12/2002 | Hiramatsu | |
| 6,570,864 B1 | 5/2003 | Kim et al. | |
| 6,690,944 B1 * | 2/2004 | Lee et al. | 455/522 |
| 6,701,130 B1 * | 3/2004 | Hamalainen et al. | 455/67.11 |
| 6,898,197 B1 * | 5/2005 | Lavean | 370/335 |

FOREIGN PATENT DOCUMENTS

| | | |
|---|---|---|
| JP | 6501349 | 2/1994 |
| JP | 6350503 A | 12/1994 |
| JP | 7501427 | 2/1995 |
| JP | 7221734 A | 8/1995 |
| JP | 8079130 A | 3/1996 |
| JP | 2000269868 A | 9/2000 |
| JP | 2002084258 A | 3/2002 |
| WO | 9200639 A1 | 1/1992 |
| WO | 9211722 A1 | 7/1992 |
| WO | 9843362 A2 | 10/1998 |
| WO | 9960739 A1 | 11/1999 |

\* cited by examiner

*Primary Examiner*—Danh C Le
(74) *Attorney, Agent, or Firm*—Katten Muchin Rosenman LLP (57) ABSTRACT

An apparatus, system and method for improving the SNR of a desired signal received at a receiver in a multiple access communication system is disclosed. The apparatus, system and method subtracts known or knowable signals from the total signal received at the receiver and the desired signal is then determined from the result of the subtraction. The known, or knowable, signals can be synchronization signals or other interfering channel signals transmitted by the transmitter, such as a wireless network base station, serving the receiver, such as a subscriber station in such a wireless network, and/or can be such signals transmitted by another transmitter, such as an adjacent base station, or an adjacent sector in multi-sector systems.

3 Claims, 4 Drawing Sheets

$$\boxed{106} = D_1(c_1c_1+c_2c_2+c_3c_3+ \ldots + c_ic_i) + (c_1s_1+c_2s_2+c_3s_3+ \ldots c_is_i) + n$$

$$= \lambda D_1 + (c_1s_1+c_2s_2+c_3s_3+\ldots c_is_i) + n$$

$$= \lambda D_1 + (c_1s_1+c_2s_2+c_3s_3+\ldots c_is_i) + n - (c_1s_1+c_2s_2+c_3s_3+\ldots c_is_i)$$

$$= \lambda D_1 + n$$

METHOD, SYSTEM AND APPARATUS FOR IMPROVING RECEPTION IN MULTIPLE ACCESS COMMUNICATION SYSTEMS

This application is a continuation of U.S. patent application Ser. No. 09/722,568, filed Nov. 28, 2000, now U.S. Pat. No. 6,952,589 now allowed, which claims priority from Canadian Patent Appln. No. 2,323,164, filed Oct. 11, 2000, the contents of which are incorporated herein by reference.

FIELD OF THE INVENTION

The present invention relates to a method, apparatus and system for improving reception in a multiple access communication system. More specifically, the present invention provides a method, apparatus and system for improving reception in a multiple access communication system by subtracting known, or knowable, received interference signals from the total received signal.

BACKGROUND OF THE INVENTION

Many multiple access communication techniques are known including time division multiple access (TDMA), frequency division multiple access (FDMA), orthogonal and vector orthogonal frequency division multiplexing (OFDM or VOFDM), code division multiple access (CDMA), hybrids such as GSM, etc. which allow a single resource, should as a radio channel, to be shared amongst multiple users. One common use for multiple access systems with radio channels is mobile telephone systems wherein multiple handsets share the radio resources of a base station.

The ability of a radio receiver employing multiple access techniques to correctly receive a signal transmitted to it is generally limited by the signal to noise ratio (SNR) the receiver experiences. The SNR experienced at a receiver is the ratio of the desired received signal to all other noise sources, including thermal noise, radio noise (noise from electrical devices such as motors, etc.), transmissions from adjacent transmitters (such as adjacent cells or sectors in a mobile telephone system) and other, non-orthogonal, signals transmitted from the transmitter to which the receiver is listening.

As used herein the term "orthogonal signal" is intended to include all signals which are arranged at transmission to have cross correlations that are ideally zero, or very small, e.g. CDMA signals are made orthogonal via application of Walsh Codes, TDMA signals are made orthogonal via assignment of time slots, etc. It should be noted that an orthogonal signal can be received at a receiver with its orthogonality somewhat reduced, due to multipath and other effects.

Clearly, the better the SNR experienced at a receiver, the better the ability of the receiver to correctly receive the signal and the better the theoretical capacity of the system, as will be discussed further below.

One example of a widely used multiple access technique is code division multiple access (CDMA), and specifically the direct sequence implementation of CDMA, which has recently gained significant support as the multiple access technique of choice for advanced wireless communication systems, such as mobile telephones or wireless local loop systems. As is known, CDMA can offer advantages over many other multiple access techniques, in that planning and management of the network is generally simplified, with the guard bands or guard times typically required in FDMA or TDMA systems, for example, not being required and good frequency reuse being obtained relatively easily.

As mentioned above, increases to the SNR experienced at a CDMA receiver are advantageous, Specifically, as the SNR experienced by a CDMA receiver is increased, more efficient use can be made of the CDMA code space, with modulation orders being increased (for example from QPSK to QAM 16) and/or higher rate error correcting codes can be used (for example increasing the code rate from ⅓ rate to ⅔ rate). As CDMA code space is a limiting factor in the capacity of a CDMA communications system, it is always desired to make efficient use of the code space.

Further advantages are obtained when transmissions in CDMA are performed at the lowest power level which is sufficient to provide the minimum SNR required for reception of the signal at the receiver at acceptable error rates. By broadcasting to a first receiver at this minimum power level, or very close to it, the interference (noise) experienced at other receivers can be reduced, further increasing the efficiency and capacity of the CDMA system as the SNR's of those other receivers will be improved.

Other multiple access systems benefit from improved SNR's in manners similar to those of CDMA and, generally, an increase in the SNR of signals received at a receiver results in improved capacity and/or reliability of the communications system.

Accordingly, it is desired to have a system, method and apparatus which can allow a multiple access communications receiver to improve the SNR of desired signals it otherwise receives from a transmitter, thus providing for overall improved performance of the system.

SUMMARY OF THE INVENTION

It is an object of the present invention to provide a novel system, method and apparatus for improving reception in a multiple access communication system which obviates or mitigates at least some of the above-identified disadvantages of the prior art. It is a further object of the present invention to provide an improved multiple access communications system and a method of operating such a system.

According to a first aspect of the present invention, there is provided a method or improving reception in a multiple access communications system, comprising the steps of:

(i) determining at least one interfering signal transmitted from a transmitter;

(ii) determining the received power level at a receiver of said at least one determined interfering signal;

(iii) subtracting said at least one determined interfering signal, at said received power level, from the total signal received at said receiver; and (iv) determining a desired signal from the result of said subtraction.

According to another aspect of the present invention, there is provided a multiple access communication system including a plurality of subscriber stations and at least one base station to transmit signals to said subscriber stations, said subscriber stations comprising:

means to receive said signals transmitted by said at least one base station;

means to determine at least one interfering signal transmitted by said base stations and the received power level of said at least one interfering signal;

means to subtract said determined at least one interfering signal at said received power level from said received signals; and means to determine a desired signal from the result of said subtraction.

The present invention provides an apparatus, system and method for improving reception in a multiple access telecommunications system, by determining and subtracting known, or knowable, interfering signals from the total signal received at a subscriber station to obtain desired signals. Common channel signals, such as primary and secondary synchronization signals, or any other known or knowable signals which act as interference to a desired signal can be subtracted from the signals received from a transmitter serving the receiver. Such interfering known or knowable signals received from other transmitters, such as adjacent sectors (in multi-sector wireless network systems) or adjacent base stations (in wireless networks) can also be subtracted. Further, known or knowable signals which are effectively interfering common channels to the receiver, such as orthogonal channels of an adjacent base station or sector, can also be subtracted.

In a 3GPP-type system, a receiver can subtract the primary and secondary synchronization signals of the transmitter serving it, as well as the same signals and the pilot channel signals of one or more adjacent sectors and/or base stations. In an IS-95-type system, a receiver can subtract common channels of adjacent base stations and sectors. In other systems, a receiver will be able to subtract known or knowable interfering signals of transmitters.

By subtracting the known or knowable signals, the interference experienced at a receiver is reduced allowing the power of the signal transmitted to that receiver to be reduced while maintaining the same SNR levels at the receiver. Thus, the level of interference experienced at other receivers is also reduced, improving their experienced SNR and allowing signals transmitted to those receivers to also be transmitted at a reduced power level. Thus, the performance of a multiple access communication system is enhanced.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

While the following discussion concentrates primarily on direct sequence CDMA as a multiple access technique, and more specifically on the proposed 3GPP implementation, the IS-95 standard and the like, the present invention is not so limited and can be usefully employed with any receiver receiving multiple access signals wherein a received known, or knowable, signal that is interfering with a received desired signal can be subtracted from the total received signal to improve the reception of the desired signal.

Figure 1:
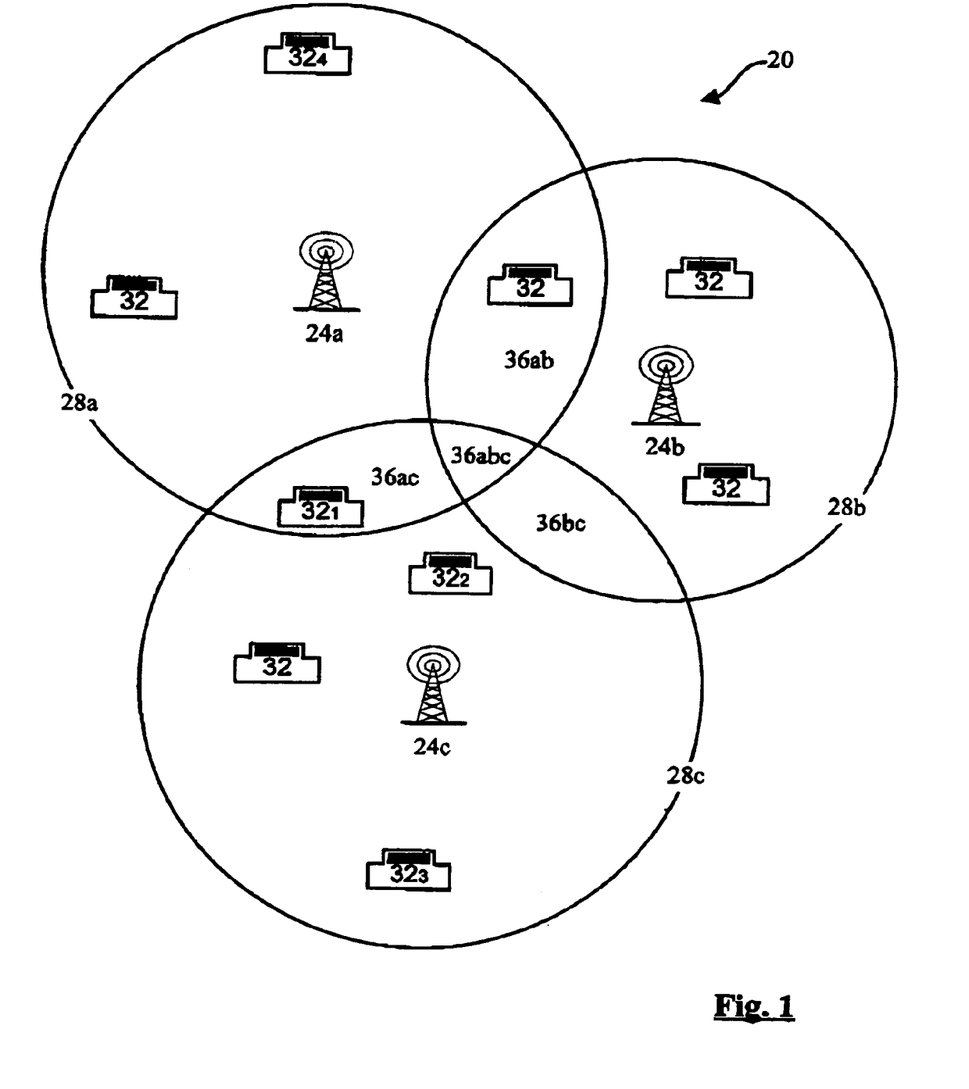
FIG. 1 shows a multiple access communications system.

A multiple access communication system is indicated generally at 20 in FIG. 1. System 20 includes a plurality of transceivers, such as base stations 24, which are connected via suitable backhauls (not shown) and gateways (not shown) or the like to a public switched telephone network (PSTN) (not shown), other base stations 24, packet data networks such as the Internet (not shown) and/or any other network of interest. As mentioned above, system 20 employs a suitable multiple access technique and specifically, in this example, employs DS-CDMA.

The transmission range of each base station 24 defines a cell 28 within which it can communicate with a plurality of transceivers, such as subscriber stations 32. A subscriber station 32 can be a mobile telephony device, a mobile data device or a wireless local loop device (providing telephony and/or data services). A cell 28 can include only one type of subscriber station 32 (such as mobile voice telephony devices) or a variety of types of subscriber stations 32 (such as mobile voice telephony and fixed voice and/or data devices). At any one time, a subscriber station 32 is typically served by the base station 24 from which it can receive signals with the best signal to noise ratio (SNR).

Data transmitted from a base station 24 to a subscriber station 32 is typically encoded with an error correcting code, such as a convolutional code, and this is typically described in terms of the resulting effective information rate. Specifically, transmissions are described as being coded at ⅓, ½, ⅔, ¾, etc. rates (i.e.—at ½ rate, two bits of data are transmitted for every one actual information bit, at ¾ rate, four bits of data are transmitted for every three actual information bits). As is known to those of skill in the art, by employing "puncturing", wherein a coded signal has a defined number of its coded bits replaced with additional data bits, a fine granularity of code rates can be achieved.

When low SNR's are expected at a subscriber station 32, low coding rates (i.e.—¼) are employed to ensure acceptable bit and/or frame error rates are experienced. As the SNR experienced at a subscriber station 32 improves, higher rate codes can be employed (e.g.—changing from a ¼ code to a ½ code) with a resulting improvement in the efficiency at which the resources (transmission capacity, or bandwidth) of system 20 are used.

Similarly, when relatively low SNR's are experienced at a subscriber station 32, transmitted data is typically modulated using low order schemes, such as QPSK, to improve the ability of the subscriber station 32 to reliably receive the transmitted data. As the SNR experienced at the subscriber station 32 improves, more aggressive (higher order) modulation schemes, such as QAM 16, QAM 64 or QAM 256 modulations can be employed, again resulting in an improvement of the efficiency at which the resources (transmission capacity, or bandwidth) of system 20 are used.

In other circumstances, if the SNR of the signal received at a subscriber station 32 improves, the power at which that signal is transmitted can be decreased until the SNR just exceeds the level needed to reliably receive the signal at a given code rate and/or modulation order and thus the degree to which the signal interferes with reception of signals at other subscriber stations 32 can be reduced, allowing those subscriber stations 32 to obtain an improved SNR.

The combinations of error coding and modulation schemes employed can be selected for a given SNR level to achieve a desired probability of frame error rate for transmissions while making efficient use of the resources of system 20. Clearly, any improvement in the SNR experienced at a receiver can provide an improvement in system efficiency and/or reliability.

In modern CDMA systems and other multiple access systems, channel schemes are employed to organize and permit acquisition, setup and use of communication between base stations 24 and subscriber stations 32. Typically, some of these channels are common channels, i.e.—are broadcast to all subscriber stations 32 in a cell 28, and other channels are orthogonal channels. As is discussed below, in some cases, common channels act as interference to other signals broadcast to subscriber stations 32 and orthogonal channels from a transmitter can act as interference to subscriber stations 32 receiving signals from other transmitters.

System 20 can be a system constructed in accordance with standards such as IS-95, wCDMA, CDMA2000, the proposed 3GPP system standard presently being agreed, or any system employing a channel scheme with one or more common channels or other interfering channels over which known or knowable data is transmitted. While the following discussion refers to the above-mentioned proposed 3GPP standard, the present invention is not limited to use with this system and can also be used other standards, such as the IS-95, wCDMA, CDMA200 or other channel schemes, as will be apparent to those of skill in the art.

As used herein, the term "knowable" signal is intended to comprise any signals which can be determined by a receiver by any means. Examples include predefined control signals, such as synchronization signals, scrambled signals, which can be described by a receiver once a descrambling code is known, signals which can be determined after explicit or blind detection operations, etc.

In the proposed 3GPP system, the common channels broadcast in the downlink direction (i.e.—from base station 24 to subscriber stations 32) include a primary synchronization channel (PSCH) and a secondary synchronization channel (SSCH). In the 3GPP system, many channels (including the orthogonal channels) are broadcast in frames of 10 ms duration, wherein each frame includes fifteen slots.

As discussed in the 3GPP documentation, which is publicly available from a number of sources (including the 3GPP organization website at www.3GPP.org), the PSCH is used by subscriber stations 32 to determine the timing of slots within frames transmitted by a base station 24. A predefined, known, data sequence is transmitted in the slots and frames of the PSCH and this sequence has been defined and arranged such that subscriber stations 32 can determine the start time of slots in frames transmitted by the base station 32.

Once the slot timing has been determined by a subscriber station 32 from the PSCH, the SSCH is examined buy the subscriber station 32 to determine the timing of the frames of the slots and other information, including scrambling codes used by the base station 24, etc. The acquisition and processing of the PSCH and SSCH channels is performed at start up of a subscriber station 32 within system 20 and, in mobile systems at least, is performed on an ongoing basis for adjacent base stations 24 to permit handoffs between cells 28.

While such a system does result in a flexible and robust communication system, it suffers from disadvantages in that the common channels act as interference at the subscriber stations 32 in the cell 28 with respect to the other received signals, reducing the SNR experienced at the subscriber stations 32.

Figure 2:
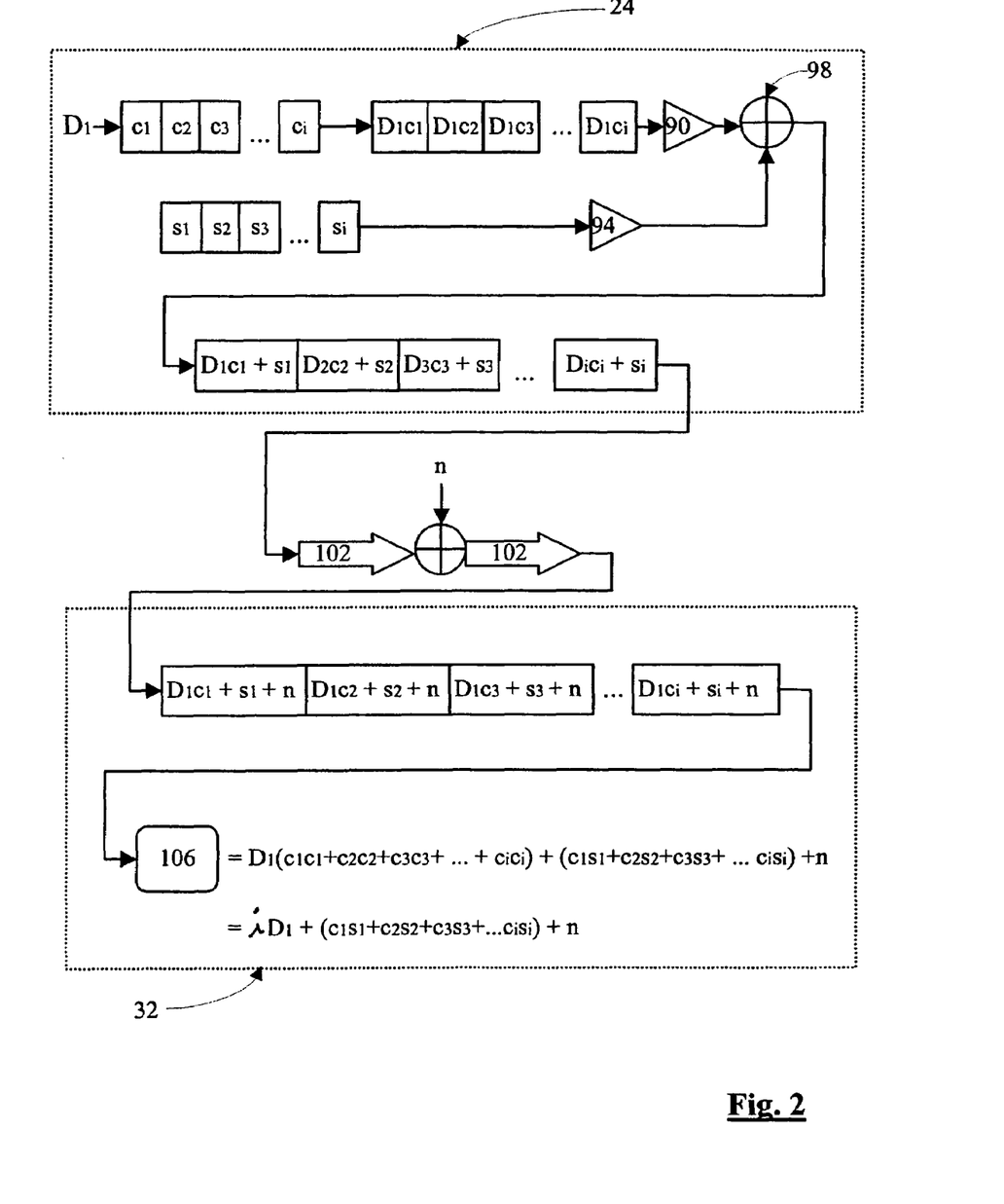
FIG. 2 shows a schematic representation of an orthogonal signal and an interfering signal broadcast and received at a receiver.

FIG. 2 shows a simplified representation of the transmission to a subscriber station 32 of a bit of a desired signal "$D_1$". As received at subscriber station 32, $D_1$ will be combined with the PSCH, SSCH, etc. FIG. 2 shows the simplified case of the combination of $D_1$ with just the PSCH, for clarity. When $D_1$ is transmitted from base station 24, $D_1$ is spread by multiplying it with the 'chips' $c_1$ through $c_i$ of a preselected spreading code. This results in the product "$D_1c_1, D_1c_2, D_1c_3 \ldots D_1c_i$" which has some amount of gain performed on it by amplifier 90. The PSCH, which comprises a predefined series of chips $s_1$ through $s_i$, has some amount of gain performed on it by amplifier 94 and is added to the above-mentioned product, at summer 98, to obtain the result "$D_1c_1+s_1, D_1c_2+s_2, D_1c_3+s_3 \ldots D_1c_i+s_i$". This result is broadcast to a subscriber station 32 over radio link 102. Some amount of noise "n" is inevitably added to the result received at subscriber station 32 during the radio broadcast, as represented by the summer in radio link 102.

At the receiver of the subscriber station 32, the received signal is of the form "$D_1c_1+s_1+n, D_1c_2+s_2+n, D_1c_3+s_3+n \ldots D_1c_i+s_i+n$" and a dot product operation 106 is performed on this result to obtain "$D_1(c_1c_1+c_2c_2+c_3c_3+ \ldots +c_ic_i)+(c_1s_1+c_2s_2+c_3s_3+\ldots c_is_i)+n$", where the effect of noise n has lumped together and represented as a single value, n. As it is known that the values of the chips "c" can only be −1 or +1 and the values of primary synchronization chips "s" can only be −1 or +1, this result can be simplified to "$iD_1+(c_1s_1+c_2s_2+c_3s_3+ \ldots c_is_i)+n$". In conventional communication systems, an estimate is then performed at the receiver by a suitable means, a viterbi decoder for example, on this result to determine the value of $D_1$. The process repeats for the next bit, $D_2$, of the desired signal.

While this system has been successfully employed in the past, the present inventor has realized that the term "$(c_1s_1+c_2s_2+c_3s_3+ \ldots c_is_i)+n$" in the result is, in fact, interference to the desired signal $D_1$, thus reducing the overall SNR experienced at a receiver and that similar interference will also occur from the SSCH signal. In fact, the interference term defined above for the PSCH alone can be written "$(c_1sp_1+c_2sp_2+c_3sp_3+ \ldots c_isp_i)+(c_1ss_1+c_2ss_2+c_3ss_3+ \ldots c_iss_i)+n$", where $sp_1$ represents the PSCH signal and $ss_i$ represents the SSCH signal.

Figure 3:
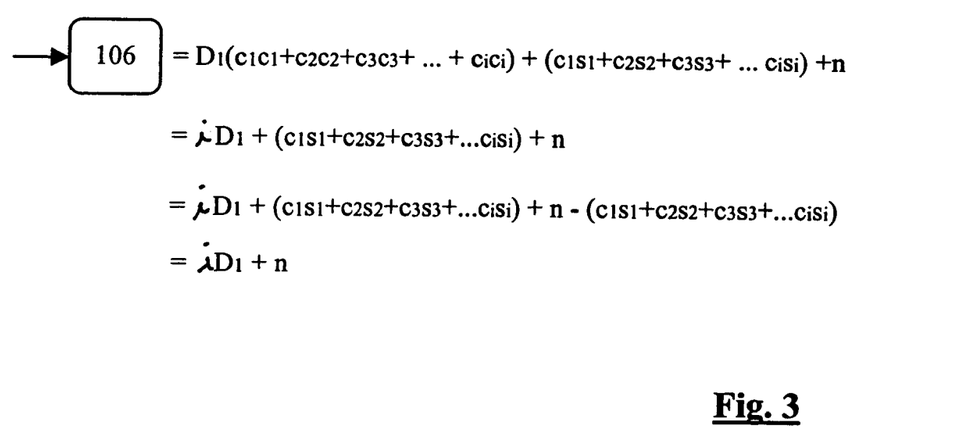
FIG. 3 shows the subtraction of known interfering signals from the signal received at a receiver in accordance with the present invention.

The present inventor has determined that the SNR experienced at a subscriber station 32 can be improved by subtracting the known PSCH and SSCH signals from the signals received at the subscriber station 32. Specifically, by receiving the PSCH and SSCH to determine the timing of the frames and slots transmitted by base station 24, subscriber station 32 has also determined the power at which the PSCH and SSCH signals have been received at the subscriber station 32. Therefore, once acquisition has been achieved and a subscriber station 32 is ready to operate, the subscriber station 32 knows the PSCH and SSCH data it has received and the power level they were received at. In accordance with the present invention, the receiver in subscriber station 32 then subtracts these known signals from the total signal received at the subscriber station 32 to reduce this source of interference to other received signals as shown in FIG. 3. Thus, the term "$(c_1sp_1+c_2sp_2+c_3sp_3+\ldots c_isp_i)+(c_1ss_1+c_2ss_2+c_3ss_3+\ldots c_iss_i)+n$" can be reduced to "n" as the values of each $c_i$ and $sp_i$ (primary synch) and $ss_1$ (secondary synch) will be known at the receiver. Each subsequent data bit $D_i$ is processed in a similar manner, with the transmission power levels of the PSCH and the SSCH being updated accordingly before being subtracted from the total received signal.

It is known that as much as 20% or more of the total power transmitted by a base station 24 will typically be utilized to transmit the PSCH and SSCH channels. As will be apparent, subtracting the PSCH and SSCH signals from the total received signal at a subscriber station 32 can result in a corresponding improvement to the SNR of the subscriber station 32.

While the subtraction is discussed above as being performed at the symbol level, in some circumstances it will be preferred that the subtraction be performed at the chip level and appropriate methods of implementing such will now be apparent to those of skill in the art. By performing the subtraction at the chip level, data signal bits $D_i$, etc. which are transmitted at different symbols rates, but the same chip rate, can be appropriately processed.

When a subscriber station 32 performs the subtraction of known signals in accordance with the present invention, system 20 can be operated in a manner which benefits from the effective decrease in signals received at subscriber station 32. Specifically, system 20 can decrease the power employed to transmit desired signal bit $D_i$ to subscriber station 32, can employ a higher rate coding scheme when transmitting $D_1$ and/or can employ a higher order modulation scheme to transmit $D_1$. These options can be used individually or combined, as appropriate or desired, to improve the transmission capacity of system 20. Further, subscriber stations 32 which are at the fringes of cell 28, and thus have marginal reception ability, can improve their SNRs, reducing their error rates or increasing their reception data rates, even though base station 24 cannot allocate additional power to their transmitted signals, due to regulatory restrictions or transmitter capabilities, and/or when no practical lower coding rate is available and/or when no lower order modulations are available. Thus it is possible to obtain improvements in total transmission capacity of base stations 24 in system 20 and/or the transmission footprint (cell size) of the base stations 24.

The present invention is not limited to the reduction of interference by the subtraction of synchronization channels and, in fact, any interfering signal which is known or knowable, such as any other communication system control signal or information signal, can be subtracted from the total signal received at a receiver to improve reception of a desired signal.

The present inventor has also developed a second embodiment of the present invention which can further improve the performance of system 20 in some circumstances. One of the limiting factors of the performance in CDMA systems, or in other multiple access systems, is interference from base stations 24 in adjacent cells 28. As shown in FIG. 1, a cell 28 can be considered as the geographic area which can be reliably serviced by a base station 24. While cells 28 are commonly illustrated as having regular shapes, commonly hexagonal or circular (as illustrated in FIG. 1), typically a cell 28 does not have a regular shape due to geographical features, such as hills, valleys, buildings, bridges, etc., or other conditions which affect the distance the radio signals from a base station 24 can reliably propagate.

Due to the irregular shape of cells 28, it is not uncommon that a cell 28 includes areas 36 that overlap with an adjacent cell 28. Such areas of overlap can also be formed intentionally by network planners to allow for handoff (transfer of a subscriber station 32 from one cell to another) or to provide additional capacity in "hot spots" in a network. In the illustrated configuration of system 20 in FIG. 1, four areas of overlap (36$ab$, 36$ac$, 36$bc$, and 36$abc$) are shown between cells 28$a$, 28$b$ and 28$c$.

While a subscriber station, such as subscriber station $32_1$, can be serviced from either base station 24$a$ or 24$c$ (in this example 24$a$) downlink transmissions from the other base station (24$c$ in this example) appear to subscriber station $32_1$ as interference to the downlink transmissions from base station 24$a$. Any subscriber station 32, such as subscriber station $32_1$ which receives the downlink transmission of more than one base station 24 will experience a reduction in its SNR with respect to the downlink transmissions received from the base station 24 that is presently servicing it. In fact, even subscriber stations, such as station $32_2$, that are outside of overlaps 36 where another base station could be reliably received, will experience some interference from those other base stations 24 although at low received power levels, thus reducing their SNR. Some other subscriber stations, such as subscriber stations $32_3$ and $32_4$, do not receive significant levels of interference from other base stations 24 as they are located well outside of the effective propagation area of such adjacent base stations 24. However, in a system 20 with multiple cells 28, there is typically only a relatively small number of subscriber stations 32 which do not receive interference from adjacent base stations 24 that measurably degrades their SNRs.

Accordingly, the present inventor has determined that a subscriber station 32 can also improve its SNR by subtracting known or knowable channels received from one or more adjacent base stations 24. Specifically, at start up, and typically on an ongoing basis, a subscriber station 32 performs an sequence of operations wherein it determines the base station 24 that it can best receive (based upon the best SNR). In this second embodiment of the present invention, a subscriber station, such as station $32_1$, can re-perform this acquisition sequence of operations to also determine the base station 24$c$ which it can receive at the next-best levels (typically, the base station receiver at the next highest received power level). If subscriber station $32_1$ determines that this next-best base station 24$c$ is being received at a power level which is higher than a pre-defined minimum power level, it will proceed to subtract the signals that it knows, which are received from the next-best base station 24$c$, from the total signal it receives to improve the SNR of the base station 24$a$ it is being serviced by as described below.

If the next-best base station 24$c$ is received at a power level less than the pre-defined level, it is deemed that the potential benefit of subtracting the signals received from it is not sufficient to justify performing these steps, and no determination and subtraction of these signals will be performed. As will be apparent, this determination of a next-best received base station 24 will be performed, from time to time, to ensure that as reception conditions change over time an appropriate action is taken.

If next-best base station 24$c$ is received at a power level greater than the pre-defined minimum, the subscriber station $32_1$ determines the slot and frame timing and the power levels of the transmissions from next-best base station 24$c$, using the same techniques as before, and subtracts the PSCH and SSCH of next-best base station 24$c$ in a manner similar to that described above. Specifically, subscriber station $32_1$ will receive a signal "$iD_1 + (c_{11}sp_{11} + c_{12}sp_{12} + c_{13}sp_{13} + \ldots c_{1i}sp_{1i}) + (c_{11}ss_{11} + c_{12}ss_{12} + c_{13}ss_{13} + \ldots c_{1i}ss_{1i}) + (c_{21}sp_{21} + c_{22}sp_{22} + c_{23}sp_{23} + \ldots c_{2i}sp_{2i}) + (c_{21}ss_{21} + c_{22}ss_{22} + c_{23}ss_{23} + \ldots c_{2i}ss_{2i}) + n$", where $c_{1i}$, $sp_{1i}$ and $ss_{1i}$ are the chip, primary and secondary synch signals of the base station 24$a$ and $c_{2i}$, $sp_{2i}$ and $ss_{2i}$ are the chip, primary and secondary synch signals of next-best base station 24$c$. A dot product is performed on this received signal and the terms "$(c_{11}sp_{11} + c_{12}sp_{12} + c_{13}sp_{13} + \ldots c_{1i}sp_{1i})$", "$(c_{11}ss_{11} + c_{12}ss_{12} + c_{13}ss_{13} + \ldots c_{1i}ss_{1i})$", "$(c_{21}sp_{21} + c_{22}sp_{22} + c_{23}sp_{23} + \ldots c_{2i}sp_{2i})$" and "$(c_{21}ss_{21} + c_{22}ss_{22} + c_{23}ss_{23} + \ldots c_{2i}ss_{2i})$" are subtracted to obtain $iD_1 + n$, from which the desired signal $D_1$ can be determined. Similar operations can be performed for other multiple access systems, such as IS-95 or other wireless systems.

In addition to known interfering common channels, channels which are broadcast as orthogonal channels by an adjacent base station 24, such as base station 24$c$, also serve as interference to subscriber stations 32 which are being served by a first base station 24, such as base station 24$a$, either because they use a scrambling code and/or Walsh code which is used by the first base station and/or because the timing of their transmission is not synchronized with that of the first base station. If the information transmitted in an orthogonal, but interfering, channel from another base station 24 is known, or can be determined (i.e.—is knowable), by a subscriber station 32, that orthogonal channel can also be subtracted from the total received signal at the subscriber station 32, further improving the SNR of the desired signals received at the subscriber station 32.

As a specific example, in systems adhering to the proposed 3GPP standard, at least one orthogonal channel at an adjacent base station will be known or knowable by a subscriber station 32. Specifically, a pilot channel (PICH) is transmitted by each base station 24 and is used for carrier offset determination at subscriber stations 32 and for other purposes. The pilot signal comprises a series of 1's that are scrambled according to the scrambling code of the transmitting base station 24 and are transmitted over a pre-defined channel.

accordingly, after a subscriber station 32, such as subscriber station $32_1$ has determined that it is receiving interference from an adjacent base station, for example 24c, at a power level above the pre-defined level, it can determine the scrambling code group of this next-best base station 24c, determine the actual scrambling code from the other information transmitted by the next-best base station 24c, in the same manner that a subscriber station 32 served by that base station 24c would determine the scrambling code, and determine the signal that would result from the scrambled series of "1's". Alternatively, the scrambling code can be directly communicated to the subscriber station 32 in a variety of manners, including via a transmission from the base station 24a serving it which can transmit the scrambling codes of all adjacent base stations 24. Thus, knowing the scrambling code and the data (the series of 1's), the knowable PICH is now known to the subscriber station.

At this point, the subscriber station $32_1$ then determines the power level at which the PICH is received, as this can change over time. It is presently contemplated that an indication of the transmission power level of the PICH will be provided by the transmitting next-best base station 24c, over the BCCH or other suitable channel, although any other suitable means as will occur to those of skill in the art can be employed, such as by estimation means, back-haul based communication between base stations 24 and wherein the power levels of all adjacent base station PICH transmissions are transmitted to subscriber stations 32 served by a base station 24, etc. It is also contemplated that the PICH power level will be provided to subscriber stations 32 as a transmission power level which is expressed relative to the transmit power of the PSCH and/or SSCH of the next-best base station 24, whose received power levels are determined by the subscriber unit 32 as part of the above-mentioned acquisition process. Thus, the received power level of the PICH can be determined by subscriber stations 32. At this point, the subscriber station $32_1$ "knows" the PSCH, SSCH and PICH of the next-best received base station 24c can subtract those signals from the total received signal at the subscriber station $32_1$ to improve the SNR of the signals it receives from the base station 24a from which it is being served.

It is expected that as much as 45% or more of the total power transmitted by a base station 24 will typically be utilized to transmit the PSCH, SSCH and PICH channels. As will be apparent, subtracting these signals from the total received signal at a subscriber station 32 can result in a corresponding improvement to the SNR of the subscriber station 32.

Figure 4:
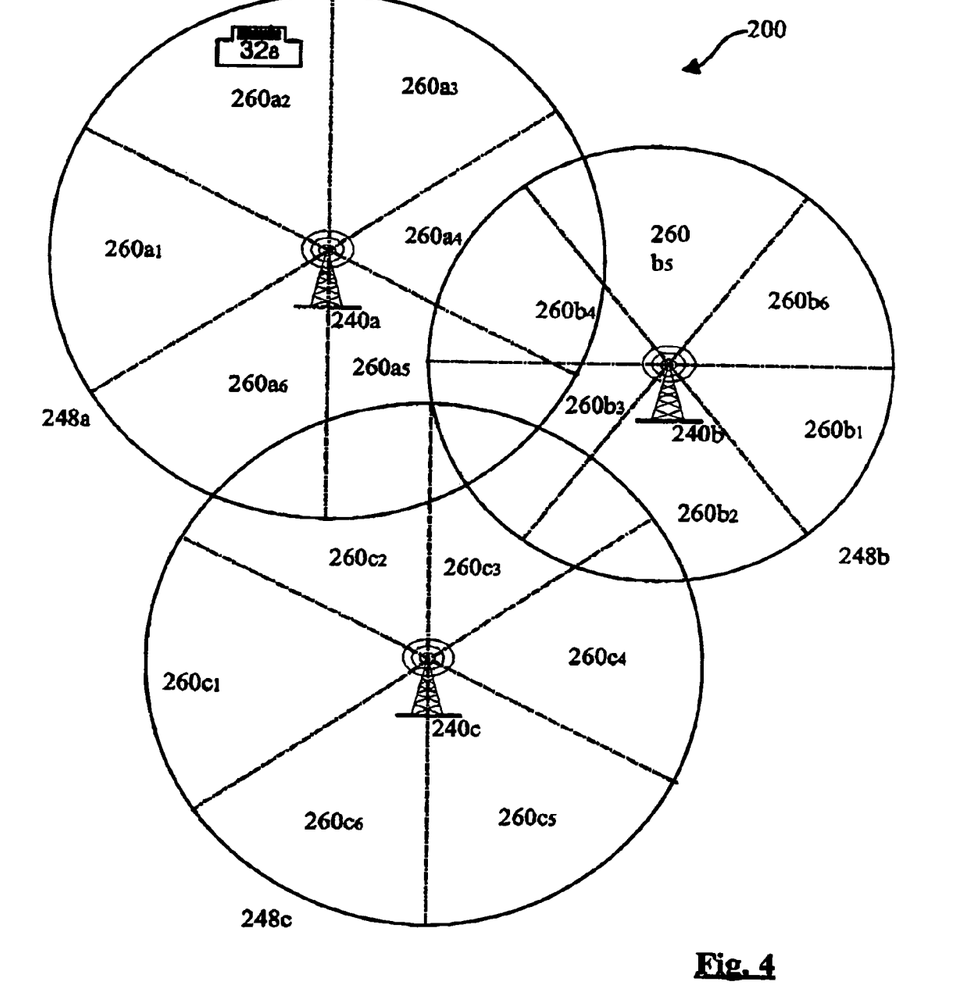
FIG. 4 shows a multiple access communications system with multi-sectored base stations.

FIG. 4 shows another configuration of a multiple access communication system 200 wherein one or more base stations 240 employ beam forming antennas (not shown), or other means, to divide their cells 248 into different sub-cells, typically referred to as sectors 260. Each sector 260 of a base station 240 communicates with the subscriber stations 32 within its beam path and range and each sector 260 in a base station 240 is provided with a transceiver for such communications. FIG. 4 illustrates cells 248a, 248b and 248c as each having six sectors $260a_x$, $260b_x$ and $260c_x$ respectively. As will be apparent to those of skill in the art, cells 248 can have different numbers of sectors 260 and system 200 can include either a homogeneous set of cells 248, each with the same number of sectors 260, or can include a heterogeneous set of cells 248 some of which have different numbers of sectors 260, e.g.—some cells 248 with a single sector 260, some cells 248 with two sectors 260, etc.

In these sectored configurations, which are expected to be commonly deployed, a subscriber station, such as subscriber station $32_8$ in sector $260a_2$ can, and often will, receive transmissions intended for an adjacent sector, such as $260a_3$ or $260a_1$. Such transmissions act as interference at subscriber station $32_8$ with respect to the transmissions it is attempting to receive from sector $260a_2$. Accordingly, subscriber station $32_8$ can perform similar operations to those described above for reducing interference from adjacent base stations to reduce interference from adjacent sectors 260. Depending upon the configuration of system 200, sectors 260 within a cell 248 can transmit frames and slots in a synchronous manner (with time offset or without) to the other sectors 260 of cell 248 or asynchronously.

In the synchronous case, a subscriber station 32 will "know" the signal on the PSCH of each other sector 260 in its cell 248, the signal on the PSCH either being identical in each sector 260, or being time offset from the signal on the PSCH in the sector 260 of the subscriber station 32 by a time (usually by a slot, or multiple thereof, in a frame) known to the subscriber station 32. Thus, in this case, the subscriber station 32 can easily subtract the PSCH of adjacent sectors 260.

In systems constructed in accordance with the proposed 3GPP standard, each sector 260 will have its own scrambling code. Thus, as with the embodiments described above, the SSCH in each sector 260 transmits the scrambling code group for that sector 260 and this scrambling code must be determined so that the SSCH and, as discussed below, the PICH can be subtracted. As sectors 260 within a cell 248 operate within a single base station 240, base station 240 can inform subscriber stations 32 in each sector 260 of cell 248 of the relevant scrambling code group and scrambling code by any suitable means, such as by transmission through the BCCH. Alternatively, the subscriber station 32 can determine the scrambling code group and scrambling code during an acquisition process for an adjacent sector, as described above for the adjacent base station case.

In the asynchronous case, a subscriber station 32 can treat an adjacent sector 260 in the same manner as that described above for an adjacent next-best base station 24 and can derive the frame and slot timing from the PSCH and SSCH, etc.

As will be apparent to those of skill in the art, the above-described embodiments can be combined as required. For example, a subscriber station 32 can subtract the PSCH and SSCH signals from the base station (or sector) serving it and can determine whether an adjacent sector 260 or adjacent base station 24 is the highest other source of interference for it and can adopt the appropriate strategy, from those described above, to reduce this additional interference. Further, it will be apparent to those of skill in the art that the present invention is not limited to canceling only the interference from one adjacent next best base station or sector and, if radio and computational resources are available in subscriber station 32, subtraction of known or knowable signals from two or more adjacent base stations and/or sectors can be performed in addition to the subtraction of the PSCH and SSCH from the base station or sector serving the subscriber station 32.

The present invention provides an apparatus, system and method for performance in the downlink direction of a CDMA telecommunications system. Known, or knowable, signals are determined and subtracted from the signals received at a subscriber station, whether a mobile or fixed station and whether the signal is voice or data or both. Subtraction of these signals improves SNR for the desired signals at the subscriber station 32, which allows transmission of the desired signals in more efficient manners, i.e.—with higher (¾ vs. ½, etc.) error coding rates and/or increased modulation orders (QAM64 vs QPSK), and/or allows the desired signals to be broadcast at a lower power level while being received with the same, or similar, error levels.

By subtracting the known signals, including those determined from knowable signals, the interference experienced at a subscriber station is reduced allowing the power of the signal transmitted to that subscriber station to be reduced while maintaining the same SNR levels at the subscriber station. Thus, the level of interference experienced at other subscriber stations is also reduced, improving their experienced SNR and allowing signals transmitted to those subscriber stations to also be transmitted at a reduced power level, higher rate code or higher order modulations. Thus, the performance of a multiple access communication system is enhanced.

The above-described embodiments of the invention are intended to be examples of the present invention and alterations and modifications may be effected thereto, by those of skill in the art, without departing from the scope of the invention which is defined solely by the claims appended hereto.

We claim:

1. A method of improving reception of a desired signal in a multiple access communications system, comprising the steps of:
    determining respective received power levels at a receiver of two interfering signals that are known a priori to the receiver and that are non-orthogonal to the desired signal; and
    subtracting those known interfering signals, at their respective determined received power levels, from a total signal received at the receiver to obtain the desired signal,
    wherein the transmitter that transmits the desired signal also transmits the known interfering signals, and
    wherein the two known interfering signals are a first synchronization signal for determining slot timing in signals transmitted by the transmitter and a second synchronization signal for determining frame timing in signals transmitted by the transmitter.

2. A multiple access communication system including a plurality of subscriber stations and a base station that transmits a desired signal to the subscriber stations, each of the subscriber stations comprising:
    a receiver to receive the desired signal and two interfering signals that are known a priori to the subscriber station and that are non-orthogonal to the desired signal;
    means to determine the received power levels of the known interfering signals; and
    means to subtract the known interfering signals at their determined received power levels from a total received signal to obtain the desired signal,
    wherein the base station transmits the known interfering signals, and wherein the two known interfering signals are a first synchronization signal for determining slot timing in signals transmitted by the base station and a second synchronization signal for determining frame timing in signals transmitted by the base station.

3. A subscriber station for use in a multiple access telecommunication system including a base station that transmits a desired signal to the subscriber station, comprising:
    a receiver to receive the desired signal and two interfering signals that are known a priori to the subscriber station and that are non-orthogonal to the desired signal;
    means to determine the received power levels of the known interfering signals; and
    means to subtract the known interfering signals at their determined received power levels from a total received signal to obtain the desired signal,
    wherein the base station transmits the known interfering signals, and wherein the two known interfering signals are a first synchronization signal for determining slot timing in signals transmitted by the base station and a second synchronization signal for determining frame timing in signals transmitted by the base station.

* * * * *